Sept. 8, 1964  H. W. SPALETTA  3,148,053
GOLD-PALLADIUM-NICKEL ALLOYS
Filed July 22, 1963
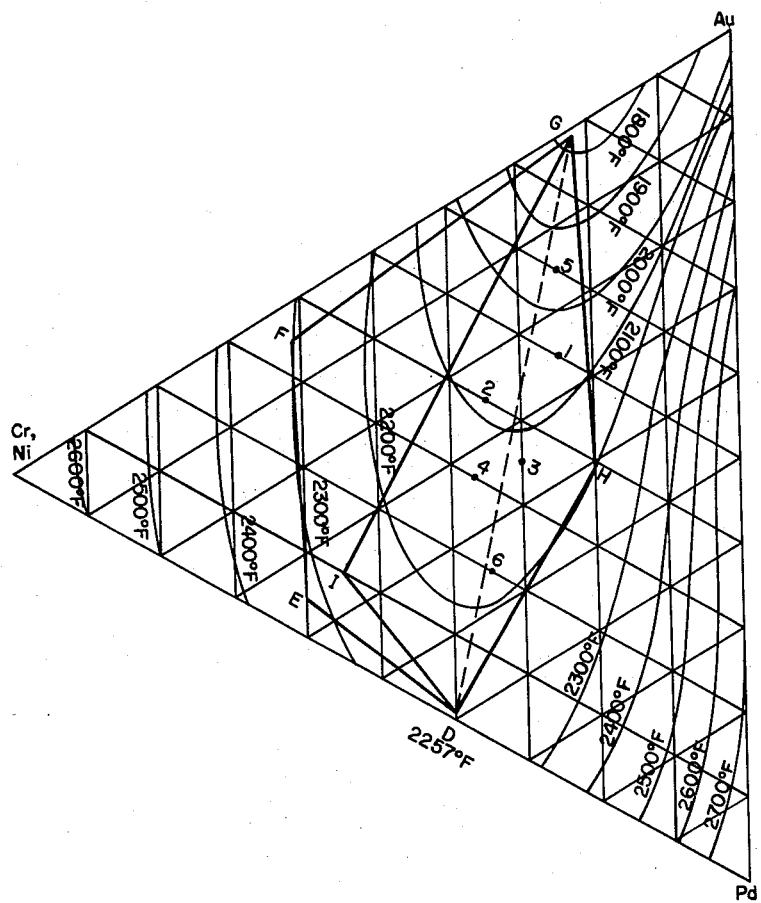
INVENTOR.
HOWARD W. SPALETTA
BY Edward O. Ansell
Joseph E. Mueth
ATTORNEYS

United States Patent Office 3,148,053
Patented Sept. 8, 1964

3,148,053
GOLD-PALLADIUM-NICKEL ALLOYS
Howard W. Spaletta, Citrus Heights, Calif., assignor to Aerojet-General Corporation, Azusa, Calif., a corporation of Ohio
Filed July 22, 1963, Ser. No. 296,654
14 Claims. (Cl. 75—134)

This invention relates to new alloys. In particular, this invention relates to new alloys containing gold, palladium and as a third component nickel or chromium or mixtures thereof.

This application is a continuation in part of my earlier U.S. patent application, Serial No. 103,292, filed April 17, 1961.

My new alloys find valuable application as brazing materials where high temperature alloys are required to be joined together. My new alloys are especially well suited for use as the brazing materials in joining high temperature alloy turbine and heat exchanger components. The thus assembled components can then be used in conventional high temperature turbines operating at temperatures above 1750° F. with speeds up to 26,000 r.p.m., and above.

It is known to braze at high temperatures to produce compound articles of high temperature alloys. However, the brazing compounds now in use are subject to serious disadvantages. The brazing compositions now widely used for applications to be used at extreme operating conditions are available only in powder form. The chemical tolerances and ingredient proportions of the prior art high temperature braze alloys are very critical therefore, rendering reproducibility of results from one operation to another very difficult. Known brazing compounds are difficult to use because they do not wet the base materials well and have such high vapor pressures that brazing cannot be carried out in a vacuum furnace.

An object of this invention is to provide a novel alloy whereby the above mentioned disadvantages of the prior art are avoided. Other objects and advantages will hereinafter appear.

To the accomplishment of the foregoing and related ends, said invention then comprises the features hereinafter fully described and particularly pointed out in the claims, the following description and the illustrative examples setting forth in detail certain embodiments of the invention, these being indicative, however, of but a few of the various ways in which the principle of the invention may be employed.

The attached figure is a chart depicting the composition of the alloy of this invention.

The examples which follow are submitted to illustrate and not to limit this invention.

EXAMPLE I

*Corrosion Resistance of Brazing Alloys*

A brazing alloy having the composition 50% gold, 25% palladium and 25% nickel, in the form of an .040 inch diameter wire, was exposed to $N_2O_4$ ($H_2O$ .1%) and to $N_2O_4$ plus 0.5% $H_2O$ for 48 hours at 100° F. The tests were repeated at 150° F. Corrosion at 100° F. was not measurable. Corrosion with $N_2O_4$ ($H_2O$ .1%) was not measurable at 150° F. With $N_2O_4$ containing 0.5% $H_2O$, the corrosion rate was less than 0.5 ml. penetration per year. An identical wire specimen was exposed to anhydrous $N_2O_4$ for 52 hours at an average temperature of 310° F. The specimen lost 3% of its weight during the exposure.

A stainless steel tube having the composition 18% chromium, 11% nickel, 0.08% carbon, 0.8% columbium and the balance iron (type 347 S.S.) was brazed to a header of the same composition with the braze alloy described above. The brazed assembly was exposed to $N_2O_4$ ($H_2O$ .1%) for 60 hours at an average temperature of 310° F. with no significant loss of joint material.

Wire specimens identical to those described above were exposed to unsymmetrical dimethyl hydrazine for 48 hours at 100° F. and 150° F. respectively. No corrosion occurred in either exposure.

EXAMPLE II

*Linear Coefficient of Thermal Expansion for Braze Alloy*

The linear coefficient of thermal expansion for the specific alloy 50% gold, 25% palladium and 25% nickel was measured and found to be as set forth in Table I. The measurements were obtained using a model HTV Leitz Inc. dilatometer.

TABLE I.—COEFFICIENT OF THERMAL EXPANSION

| Temperature range (° F.): | Linear coefficient of thermal expansion (in./in., ° F.) |
|---|---|
| 73 to 1700 | $8.68 \times 10^{-6}$ |
| 73 to 1505 | $8.57 \times 10^{-6}$ |
| 73 to 1275 | $8.62 \times 10^{-6}$ |

EXAMPLE III

*Oxidation Resistance*

An 0.04 inch diameter type 347 stainless steel wire and a wire identical to those described in Example I, above, were exposed for 25 hours in air at 1700° F ± 10° F. No significant difference in the resistance to oxidation by the two wires was observed.

EXAMPLE IV

*Vertical Flow Characteristics of Braze Alloy*

Two stainless steel blocks (347 S.S.) were placed adjacent one another so that the space between the two vertical faces of the blocks, which were to be joined, had a present clearance of 0.025 in. A piece of brazing foil was placed on top of the space between the two blocks. The assembly was inserted in a hydrogen atmosphere brazing furnace and raised to the brazing temperature where it was held for five minutes. This procedure was repeated with different braze alloys and temperatures as set forth in Table II. After cooling, the brazed assemblies were examined and in every instance it was found that the braze alloy had wetted the base material and flowed so as to completely fill the vertical space between the blocks, without spilling out the bottom of the space or hanging in the top of the space. All the joints were found to be of good uniform quality throughout.

TABLE II.—VERTICAL FLOW CONDITIONS

| Alloy composition, designated by the numbered points on the chart in the figure: | Braze temperature (° F.) |
|---|---|
| Point 1 | 2060 |
| Point 2 | 2075 |
| Point 3 | 2110 |
| Point 4 | 2130 |

EXAMPLE V

*Ultimate Tensile Strength of Brazed Specimens*

The ultimate tensile strengths of various base materials containing brazed joints were determined according to the procedure set forth in Federal Test Method Standard No. 151a, dated May 6, 1959. All tensile specimens were standard 0.250 inch round tensile specimens. The tests were accomplished using a 60,000 lb. Baldwin-Lima-Hamilton Universal type machine.

TABLE III.—ULTIMATE TENSILE STRENGTHS

| Test | Base material[1] | Braze alloy[2] | Preset clearance (in.) | Braze temp. (° F.) | Test temp. (° F.) | Ultimate tensile strength (p.s.i.) | Remarks |
|---|---|---|---|---|---|---|---|
| 1 | A | (1) | 0.008 | 2,150 | 73 | 133,800 | Parent metal unplated, fluoride flux. |
| 2 | A | (1) | 0.008 | 2,150 | 1,700 | 41,100 | |
| 3 | A | None | | | 1,700 | 68,000 | Ultimate tensile strength of parent metal at 1700° F. |
| 4 | B | (2) | 0.012 | 2,150 | 1,700 | 13,800 | |
| 5 | B | (2) | 0.008 | 2,150 | 1,700 | 15,100 | |
| 6 | B | (2) | 0.020 | 2,150 | 1,700 | 14,200 | |
| 7 | B | (2) | 0.016 | 2,150 | 1,700 | 14,000 | |
| 8 | C | (2) | 0.008 | 2,150 | 73 | 125,000 | |
| 9 | C | (2) | 0.008 | 2,150 | 73 | 125,000 | |
| 10 | C | (1) | 0.008 | 2,050 | 73 | 115,000 | |
| 11 | D | (2) | 0.008 | 2,150 | 73 | 115,000 | |
| 12 | B | None | | | 1,700 | 34,000 | Ultimate tensile strength of parent metal at 1700° F. |
| 13 | D | do | | | 1,700 | 37,000 | Do. |
| 14 | D | (2) | 0.001 | 2,150 | 1,700 | 30,000 | |
| 15 | D | (2) | 0.004 | 2,150 | 1,700 | 22,500 | |
| 16 | D | (1) | 0.001 | 2,150 | 1,700 | 30,000 | |
| 17 | D | (1) | 0.004 | 2,150 | 1,700 | 20,000 | |
| 18 | D | (1) | 0.008 | 2,150 | 1,700 | 27,000 | |

[1] The base materials had the following compositions:
A. (Rene 41):
3% to 3.3% titanium
1.4% to 1.6% aluminum
18% to 20% chromium
9% to 10.5% molybdenum
10% to 12% cobalt and the balance nickel
B. H.S. 31):
24.5% to 26.5% chromium
7% to 8% tungsten
9.5% to 11.5% nickel and the balance cobalt
C. (H.S. 25):
0.05% carbon
1.5% manganese
up to 1.0% silicon
20% chromium
10% nickel
53% cobalt
15% tungsten and
1.0% Fe
D. (N 155):
0.1% to 0.2% nitrogen
20% to 25% chromium
2.5% to 3.5% molybdenum
18.5% to 21% cobalt
2% to 3% tungsten
19% to 21% nickel and the balance iron.

[2] The braze alloys had the following compositions:
(1) 50% gold, 25% nickel and 25% palladium
(2) 33% gold, 28% nickel, 33% palladium, 6% chromium.

In each of the tests conducted at 73° F., the specimen broke in the base material rather than the brazed joint. In each of the tests conducted at 1700° F., the specimen broke in the brazed joint. Each of the joints was brazed for five minutes in a furnace under a hydrogen atmosphere. In the test conducted at 1700° F., the specimen was heated to 1700° F. and held there for 15 minutes before the load was applied.

EXAMPLE VI

*Brazed Joint Hardness*

A base metal, block (1) (Inconel 713C), having the composition:

0.25% to 1.25% titanium
5.5% to 6.5% aluminum
3.5% to 5.5% molybdenum
11% to 14% chromium
1% to 3% of columbium plus tantalum and the balance nickel, was brazed to another base metal, block (2) (Waspaloy), having the composition:

12% to 15% cobalt
3.5% to 5.0% molybdenum
2.60% to 3.25% titanium
1.0% to 1.5% aluminum
0.05% to 0.12% zirconium
0.003% to 0.01% boron
18% to 21% chromium and the balance nickel, using a brazing alloy having the composition represented by point 1 on the chart in the figure. The base metals were unplated and no flux was used. Brazing was carried out in a vacuum furnace at a temperature of 2075° F. for 15 minutes.

Upon etching with potassium iodide and iodine, the brazed joint was found to have a uniform dendritic structure across its entire cross-section.

The hardness of the joined materials was measured at several points in and near the joint with a Knoop Micro Hardness Tester using a 1000 gm. load. Knoop hardness was converted to Rockwell C hardness. Hardness remained substantially uniform across the entire joint. Table IV sets forth the measured results.

TABLE IV.—BRAZED JOINT HARDNESS

| Distance from center of brazed joint (in.) | Hardness (Rockwell C) | Nature of metal at point tested |
|---|---|---|
| 0.120 left | 34 | Block (2). |
| 0.090 left | 35 | Do. |
| 0.060 left | 35 | Do. |
| 0.030 left | 37 | Do. |
| 0.026 left | 36.5 | Interface between block (2) and joint. |
| 0.020 left | 38 | Brazed joint. |
| Center | 38 | Do. |
| 0.020 right | 38 | Do. |
| 0.027 right | 33.5 | Interface between block (1) and joint. |
| 0.031 right | 35 | Block (1). |
| 0.060 right | 35 | Do. |
| 0.900 right | 38 | Do. |
| 0.120 right | 30 | Do. |

Referring to the figure which contains a ternary chart exemplifying the composition of the alloy of this invention, the area included within heptagon D, E, F, G, H represents that area of alloy composition which finds particularly valuable application as brazing materials. The area enclosed by quadrangle G, H, D, I defines the composition of my preferred brazing alloy. Specific alloys falling within my preferred composition melt over a small temperature range, making them very useful in step brazing procedures, as is explained more fully below.

The dashed line G, D represents the preferred dividing line as to the application of my new brazing alloy. Brazing alloy which has a composition falling on the palladium side of dashed line G, D in the pentagon G, H, D, that is:

From about 77% to about 1% gold
From about 59% to about 1% palladium
From about 20% to about 40% nickel and
From about 0% to about 10% chromium, is particularly applicable to the brazing of heavy articles since this composition tends to alloy or mingle considerably with the base metal thus forming an alloy with the base metal itself. Alloy having a composition falling on the nickel side of dashed line G, D in the quadrangle G, D, E, F, that is:

From about 77% to about 1% gold
From about 59% to about 1% palladium
From about 61% to about 22% nickel and
From about 0% to about 10% chromium, is preferably applied to the brazing of thin members since this alloy minimizes erosion with the base metal. A brazed joint prepared with this brazing alloy is comprised primarily of brazing alloy rather than being a mixture of the base metal with the brazing alloy.

My preferred alloy which has a composition falling on the nickel side of dashed line G, D, is that defined by triangle G, D, I, that is:

From about 77% to about 1% gold
From about 59% to about 1% palladium
From about 55% to about 22% nickel and
From about 0% to about 10% chromium.

My preferred alloy which has a composition falling on the palladium side of dashed line G, D, is that defined by triangle G, H, D, that is:

From about 77% to about 1% gold
From about 59% to about 1% palladium
From about 40% to about 20% nickel and
From about 0% to about 10% chromium.

As indicated on the chart in the figure, chromium can be substituted in whole or in part for the nickel present in the alloy. My preferred metal is nickel.

The curved temperature lines 1800° F., 2000° F., etc., in the chart, indicate the temperatures at which the alloy of this invention becomes liquid, that is, its liquidus. With respect to temperature, any point on the chart is represented at the temperature where the composition of that point just becomes liquid.

Chromium in the amount of up to about 10% can also be introduced into this ternary mixture, not in substitution for the nickel, but as a fourth metal. The function of the chromium is to improve corrosion resistance and the high temperature properties of the brazing alloy. Chromium improves the strength of the alloy at high temperatures but does not produce any significant change in the solidus or liquidus temperatures of the alloy. Since chromium has a higher vapor pressure than cobalt or nickel, it is preferable to use the latter two metals where a vacuum brazing furnace is used.

The presence of palladium in the brazing alloy produces marked advantages. Even low percentages of palladium serve to substantially improve the wettability and flow characteristics of the molten braze alloy.

As can be seen from the chart in the figure, my new alloy can contain:

From about 77% to about 1% gold
From about 59% to about 1% palladium and
From about 61% to about 20% of any of the metals, nickel or chromium, or mixtures thereof My preferred brazing alloy contains:

From about 77% to about 1% gold
From about 59% to about 1% palladium and
From about 55% to about 20% of any of the metals nickel or chromium, or mixtures thereof Specific alloy compositions which have been found particularly useful in the production of brazed heavy articles include the following:

From about 55% to about 45% gold
From about 30% to about 20% palladium
From about 30% to about 20% nickel and
From about 0% to about 10% chromium the alloy From about 40% to about 30% gold
From about 40% to about 30% palladium and
From about 35% to about 25% nickel with from 0% to about 10% chromium the alloy From about 25% to about 15% gold
From about 50% to about 40% palladium
From about 40% to about 30% nickel and
From 0% to about 10% chromium the alloy From about 65% to about 55% gold
From about 20% to about 10% palladium
From about 30% to about 20% nickel and
From 0% to about 10% chromium Alloys which have been found to be particularly useful in the brazing of light-weight articles include the following:

From about 45% to about 35% gold
From about 30% to about 20% palladium
From about 40% to about 30% nickel and
From 0% to about 10% chromium the alloy From about 35% to about 25% gold
From about 39% to about 29% palladium
From about 41% to about 31% nickel and
From 0% to about 10% chromium It will be understood by those skilled in the art that my alloy can contain trace impurities such as carbon, manganese, silicon, etc., which are unavoidable even with the purest starting materials and best techniques.

As is apparent from examination of the ternary chart in the figure, the brazing alloys of this invention provide a convenient system for step brazing. In step brazing two pieces are brazed together at a high temperature, 2200° F., using a high melting point alloy, such as that represented by point 6 on the chart. The solidus, that is, the point at which the alloy starts to melt, for this alloy is about 2150° F. and the liquidus, or the point where the alloy is completely melted, is about 2175° F. The composite piece is then removed from the furnace in which it was brazed. A third piece and the necessary brazing alloy are positioned next to the other two united pieces. The piece is then placed in the furnace again and brazed at a lower temperature of 2150° F. The use of a lower temperature is possible by using a braze alloy of the composition represented by point 4 on the ternary chart. The solidus for this alloy is about 2080° F. and the liquidus to about 2125° F. Since the second brazing step is carried out at a temperature below the liquidus of the alloy with which the first joint was brazed, the first braze will not be remelted. The article is then removed for a second time from the furnace and the procedure repeated again using a brazing alloy of the composition represented by point 2 on the attached ternary chart. This alloy has a solidus of about 2015° F. and a liquidus of about 2080° F. A fourth piece is thus brazed to this composite structure using a temperature of 2100° F. without remelting either of the first two braze joints. The procedure is repeated for a fourth time using a braze temperature of 1975° F. with an alloy of the composition represented by point 5 on the ternary chart. The solidus of this alloy is about 1875° F. and the liquidus is about 1950° F. Step brazing is used where it is difficult or impossible to hold all the elements of an assembly in their proper positions at one time.

The brazing alloy of this invention finds valuable application in the joining together of similar or dissimilar base materials. This alloy is particularly useful in joining together high temperature metals and alloys, for example, stainless steels, nickel, cobalt, zirconium, tantalum, titanium, chromium, vanadium and their high temperature alloys; low, medium, and high carbon steels, alloy tool steels, sintered carbides; electronic tube materials, such as tungsten, molybdenum and cadmium, etc.

A flux can be used if desired. Conventional fluxes typical of those which can be used include chlorides, fluorides, borates, borax, boric acid, fluoborates, wetting agents, etc.

The base materials brazed with this alloy should be cleaned and prepared by conventional physical or chemical methods before brazing. It is not necessary to plate the base materials before brazing, as excellent joints are prepared without this procedure, but plating can be used if desired.

The brazing foils of this invention are adapted to be used in vacuum, inert or reducing atmosphere furnaces. The brazing alloy of this invention finds valuable application where vacuum is used in the brazing furnace since all three components of this alloy have relatively low vapor pressures. At 2250° F. the vapor pressure of gold is 0.0002 mm. Hg, palladium is 0.000045 mm. Hg, nickel is 0.00006 mm. Hg and chromium is 0.019 mm. Hg. A brazing operation employing this brazing alloy can be carried out using any of the conventional brazing processes such as torch, arc, furnace, induction, resistance, dip, block and flow. The alloy of this invention is ductile enough to be produced and used in foil, wire or other shaped forms which are the preferred forms; however, it can be used as a powder if desired.

Joints prepared using the braze alloy of this invention can be subjected to continuous operating temperatures up to 1900° F. and above, without detrimental result.

The alloy of this invention does not contain secondary brittle phases. Therefore, brazed joints prepared using this alloy are relatively homogeneous across their entire cross-section having relative uniform properties throughout.

Very precise control of proportions of ingredients in this alloy is not necessary since slight variations in composition do not materially affect the physical properties of this alloy. This permits obtaining accurate, reproducible results from one batch to another of brazing alloy. Any specific composition of alloy of this invention melts over a narrow temperature range.

In preparing objects from the alloy of this invention, it is possible to use any desired heating rate or section size. The preset clearance between the articles being brazed need not be carefully controlled. Preset clearances from 0.000 in. to 0.125 in., and larger, have been used with success. In the instance where a 0.000 in. preset clearance is used, the pieces to be brazed are clamped together and the braze alloy is placed over the joint to be brazed. The braze alloy will erode the base metals at the joint during brazing and, thus, work its way all through the joint.

The brazing allow of my invention can be selected so that it will flow at the annealing range of the high temperature alloy base materials. Thus, one heating step can perform both the annealing and brazing operations.

This brazing alloy finds particular utility where the brazed assembly must be inspected for flaws by non-destructive means. This alloy has a high density, in the range from 12 to 15 grams per cubic centimeter, compared to most high temperature base metals which have a density of about 7.5 to 8.5 grams per cubic centimeter. The denser joint prepared using this alloy shows up clearly in an X-ray and any flaws in the joint are readily apparent.

This brazing alloy is extremely resistant to corrosion by hot gases, moist conditions or corrosive liquids.

The linear coefficient of thermal expansion of this brazing alloy is close to that of most high temperature base metals. Most high temperature base metals have a coefficient of about 7.0 to 9.0×10⁻⁶ in./in/° F., whereas this alloy has a coefficient of about 8.6×10⁻⁶ in./in./° F. The closeness of these coeffiient reduces the danger of cracking the joint or adjacent base metal during temperature cycling.

It will be understood that various modifications can be made in this invention without departing from the spirit thereof or the scope of the claims.

I claim:
1. An alloy consisting essentially of from about 77% to about 1% gold, from about 59% to about 1% palladium, and from about 61% to about 20% of the metal selected from the group consisting of nickel, chromium, and mixtures thereof.
2. An alloy consisting essentially of from about 77% to about 1% gold, from about 59% to about 1% palladium and from about 55% to about 20% of nickel.
3. An alloy consisting essentially of from about 77% to about 1% gold, from about 59% to about 1% palladium and from about 55% to about 20% of nickel and up to about 10% by weight of chromium.
4. An alloy consisting essentially of from about 77% to about 1% gold, from about 59% to about 1% palladium and from about 55% to about 20% chromium.
5. An alloy consisting essentially of from about 77% to about 1% gold, from about 59% to about 1% palladium, from about 61% to about 22% of nickel and up to about 10% by weight of chromium.
6. An alloy consisting essentially of from about 55% to about 45% gold, from about 30% to about 20% palladium, from about 30% to about 20% nickel and up to about 10% by weight of chromium.
7. An alloy consisting essentially of from about 45% to about 35% gold, from about 30% to about 20% palladium, from about 40% to about 30% nickel and up to about 10% by weight of chromium.
8. An alloy consisting essentially of from about 40% to about 30% gold, from about 40% to about 30% palladium, from about 35% to about 25% nickel and up to about 10% by weight of chromium.
9. An alloy consisting essentially of from about 35% to about 25% gold, from about 39% to about 29% palladium, from about 41% to about 31% nickel and up to about 10% by weight of chromium.
10. An alloy consisting essentially of from about 65% to about 55% gold, from about 20% to about 10% palladium, from about 30% to about 20% nickel and up to about 10% by weight of chromium.
11. An alloy consisting essentially of from about 25% to about 15% gold, from about 50% to about 40% palladium, from about 40% to about 30% nickel and up to about 10% by weight of chromium.
12. An alloy consisting essentially of the metals gold, palladium and nickel, the proportions of said metals being selected so that the resulting alloy has a composition falling within the area bounded by the pentagon G, F, E, D, H on the chart shown in the attached figure; and up to about 10% by weight of chromium.
13. An alloy consisting essentially of the metals gold, palladium and nickel, the proportions of said metals being selected so that the resulting alloy has a composition falling within the area bounded by the quadrangle G, H, D, I on the chart shown in the attached figure; and up to about 10% by weight of chromium.
14. An alloy consisting essentially of from about 77% to about 1% gold, from about 59% to about 1% palladium, from about 55% to about 22% nickel and up to about 10% by weight of chromium.

References Cited in the file of this patent
UNITED STATES PATENTS

| 1,165,448 | Richter | Dec. 28, 1915 |
| 2,900,251 | Evans et al. | Aug. 18, 1959 |